United States Patent Office 3,634,393
Patented Jan. 11, 1972

3,634,393
SALTS OF MEGALOMICIN COMPLEXES
Solomon Motola, West Orange, N.J., assignor to Schering Corporation, Bloomfield, N.J.
No Drawing. Filed July 7, 1969, Ser. No. 839,634
Int. Cl. C07c 129/18
U.S. Cl. 260—210 AB    7 Claims

ABSTRACT OF THE DISCLOSURE

Disclosed herein are alkali metal dihydrogen phosphate salts of megalomicin complex and its components, said salts providing stable aqueous antibiotic solutions.

---

Megalomicin, also known as Antibiotic W847, is a recently discovered macrolide antibiotic complex having valuable antibacterial properties. This complex and its components are described, for example, in Belgian Patent No. 715,638 and in the Abstracts, 8th Interscience Conference on Antimicrobial Agents and Chemotherapy, Oct. 21–23, 1968, pages 4–5. It can be prepared by the aerobic fermentation of Micromonospora W847 as described in the aforesaid patent.

Megalomicin complex is recognized as comprising several distinct chemical entities which are each closely related amine-containing macrolide antibiotics. These entities have been designated respectively as megalomicin A, megalomicin B, megalomicin $C_1$ and megalomicin $C_2$. They are now believed to have the following structural formulae:

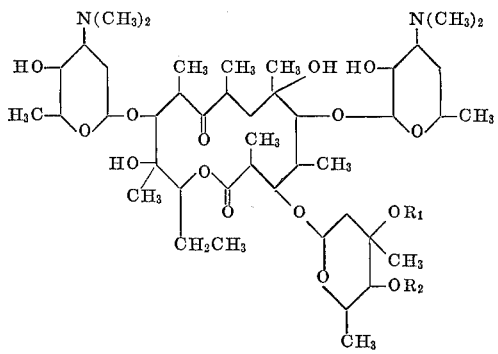

wherein megalomicin A, $R_1$ and $R_2$ are hydrogen; in megalomicin B, $R_1$ is hydrogen and $R_2$ is acetyl; in megalomicin $C_1$, $R_1$ and $R_2$ are acetyl; and in megalomicin $C_2$, $R_1$ is acetyl and $R_2$ is propionyl. For convenience, these entities and their mixtures may be referred to herein as "a megalomicin" and "megalomicins."

The usefulness and desirability of the megalomicins have been limited by the fact that the free bases are practically insoluble in water and their heretofore known acid addition salts are unstable in the dry state and in aqueous solution. Thus, their aqueous solutions have only a very short shelf life and should be formulated immediately before use. Also, the salts known heretofore have been difficult to work with since they are hygroscopic.

I have now discovered a small class of salts of the megalomicins which are stable both in the solid state and in aqueous solution and are relatively easy to work with. They provide excellent parenteral solutions having long shelf life. These substances are the alkali metal dihydrogen phosphate salts and may be represented in the solid state by the formula:

$$A \cdot 2MH_2PO_4$$

wherein A is a megalomicin antibiotic and M is an alkali metal.

The preferred alkali metal for the purposes of this invention is potassium. Similarly the preferred megalomicin antibiotic is megalomicin A. The preferred salt is bis (potassium dihydrogen phosphate) megalomicin A.

In aqueous solution, these salts of course dissociate. The pH of these dissociated solutions should be within the range of 6 to 8.5 and preferably about 7 to 7.8. The alkali metal dihydrogen phosphate need not be present in exactly a two-fold molar amount as compared to the megalomicin, e.g. a 2.4 molar ratio may be permissible, as long as the foregoing pH requirements are met.

The salts of this invention are preferably prepared by the reaction of the corresponding megalomicin with the desired alkali metal dihydrogen phosphate in aqueous solution. Preferably an approximately stoichiometric ratio of reactants is employed, i.e. about two moles of alkali metal dihydrogen phosphate per mole of megalomicin base. The desired solid salt can be recovered by conventional lyophilization techniques.

Alternatively the salts of this invention may be prepared by first forming a solution of the phosphate salt of megalomicin ($A \cdot 2H_3PO_4$) and then rapidly titrating with the desired alkali metal hydroxide. This procedure is not preferred in view of the instability of the megalomicins under the acidic pH conditions of the phosphate salt solution.

The following example illustrates the preparation of a representative composition of matter of this invention.

EXAMPLE 127 grams megalomicin A and 44.5 grams of potassium dihydrogen phosphate are added to 1300 ml. distilled water and the mixture is stirred for 24 hours. The slightly cloudy solution is then filtered and the filtrate is lyophilized. The resultant product has a melting point of about 191° C. and $[\alpha]_D$ —58±3° (water).

The above salt is soluble in water at room temperature to a concentration of 230 mg./ml. A solution of 100 mg./ml. is stable at room temperature for at least 190 days.

By substituting the corresponding megalomicin antibiotic for megalomicin A in the example, one can similarly produce the potassium dihydrogen phosphate salts of megalomicin complex, megalomicin B, megalomicin $C_1$, and megalomicin $C_2$. Similarly, by employing sodium dihydrogen phosphate or lithium dihydrogen phosphate in place of potassium dihydrogen phosphate in the example, one can produce the corresponding sodium and lithium salts, respectively.

The salts of this invention are equal to or superior to the corresponding insoluble megalomicin base in regard to potency, spectrum, protective activity and acute toxicity as described, for example, in Belgian Patent No. 715,638. The aqueous solutions of this invention are particularly well suited for intramuscular injections. A suitable daily injectable dose would be about 0.3 to 8 mg./kg. of body weight, and preferbly about 1.5 to 2 mg./kg.

Particularly in view of their broad anti-bacterial spectrum, the aqueous salt solutions of this invention may also be used to clean and sterilize laboratory glassware, surgical instruments and the like. The salts may also be used in combination with appropriate soaps and detergents to clean and sanitize areas used for food preparation such as kitchens, dining halls and the like.

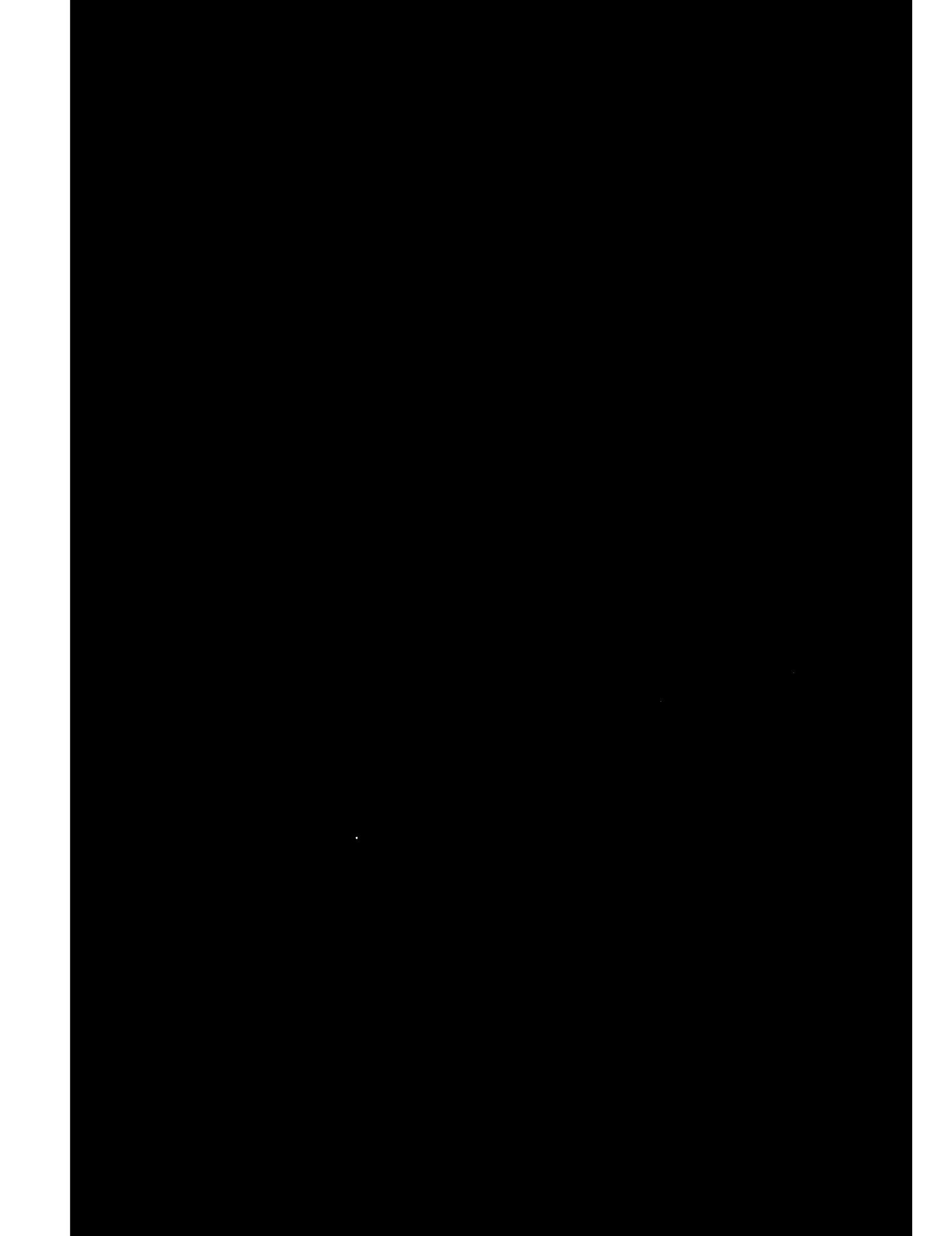

I claim:
1. A solid stable salt represented by the formula

$$A \cdot 2MH_2PO_4$$

wherein A is a megalomicin antibiotic and M is an alkali metal.
2. A salt according to claim 1 wherein A is megalomicin A.